April 16, 1968   G. T. DAVIES ET AL   3,378,228
BLADES FOR MOUNTING IN FLUID FLOW DUCTS
Filed March 13, 1967

Inventors
Glyn Twiston Davies
William James Howard
By
Cushman, Darby, Cushman
Attorneys United States Patent Office 3,378,228
Patented Apr. 16, 1968

3,378,228
BLADES FOR MOUNTING IN FLUID
FLOW DUCTS
Glyn Twiston Davies, Milford, and William James
Howard, Derby, England, assignors to Rolls-Royce
Limited, Derby, England, a British company
Filed Mar. 13, 1967, Ser. No. 622,756
Claims priority, application Great Britain, Apr. 4, 1966,
14,957/66
6 Claims. (Cl. 253—39.1)

ABSTRACT OF THE DISCLOSURE

A blade for a fluid flow duct comprises ceramic laminations which may be in two or more parts. The laminations are held together in compression by a hollow tie bar through which cooling air may be passed. The blades are mounted between platform members.

---

This invention comprises improvements in or relating to blades for mounting in fluid flow ducts.

The term "blade" as used herein is intended to include vanes for mounting in fluid flow ducts. The invention is particularly applicable to blades which in use are exposed to high temperature gas streams, for example, the turbine nozzle guide vanes or stator blades of a gas turbine engine.

Where blades are exposed to high temperature gas flows, it is desirable to fabricate the blade from ceramic material. Unfortunately, ceramic materials have characteristically low resistance to tensile loading. Consequently, if blades are formed as an integral structure from ceramic material, they are prone to failure if subjected to tensile loading, and on such failure the entire blade would be likely to collapse.

The blade according to the present invention comprises a plurality of laminar sections each formed of ceramic material, platform members having recesses, the opposite ends of the blade being received in respective recesses formed in respective platform members, and at least one tie member, the laminar sections being held together in compression by the at least one tie member which is secured at opposite ends to respective platform members.

Since the laminar sections of the blade according to the invention are held together in compression, they are not likely to be subjected to tensile loading, and consequently the ceramic material comprising the laminar sections is not likely to fail. Moreover, even if one of the laminar sections were to fail, any crack formed therein would be confined to that particular section and would not affect the remainder of the blade.

Preferably each laminar section comprises one or more separate portions of ceramic material. Thus each laminar section may comprise inner and outer portions of ceramic material, said portions being in contact with each other.

A passage for cooling fluid may extend through the blade. Thus the or each tie member may have a hollow interior constituting said passage.

The invention will be described, merely by way of example, with reference to the accompanying drawings, in which.

Figure 1:
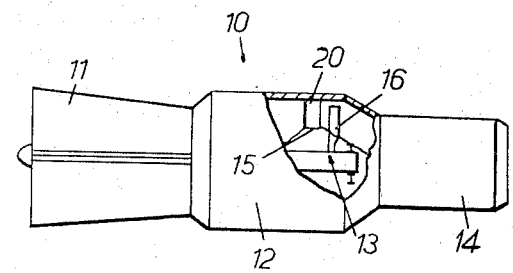
FIGURE 1 shows, purely diagrammatically, a gas turbine engine incorporating the present invention, part of the gas turbine engine being shown cut away.

FIGURE 1 shows a gas turbine engine 10 having, conventionally, a compressor 11, combustion equipment 12, a turbine 13 and jet pipe 14, all in flow series. The portion cut away in FIGURE 1 shows, purely diagrammatically, part of an annular nozzle 15 at the downstream end of the combustion equipment 12 and upstream of a turbine rotor stage 16. Mounted in the nozzle is a plurality of angularly spaced apart nozzle guide vanes 20 which extend radially across the nozzle 15 and which serve to guide the hot combustion gases from the combustion equipment 12 into the turbine 13.

Figure 2:
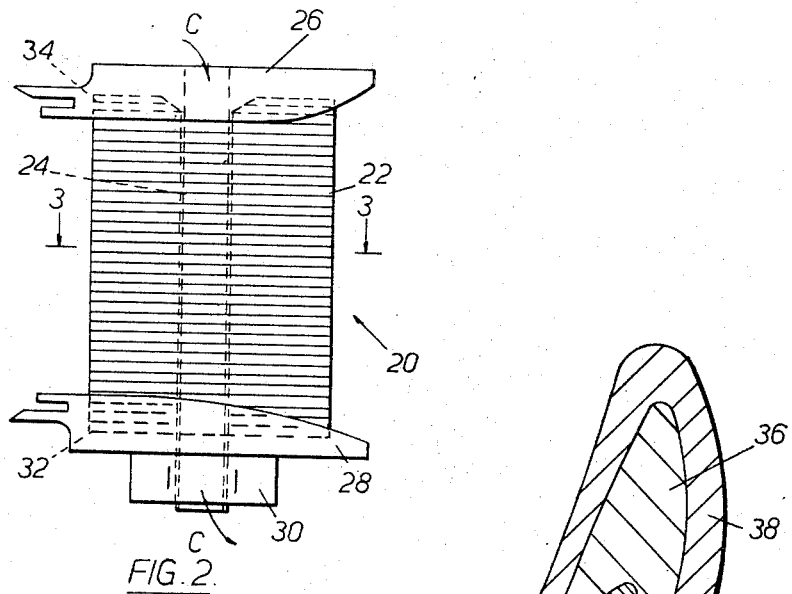
FIGURE 2 is a side elevation of a nozzle guide vane constructed in accordance with the present invention.
Figure 3:
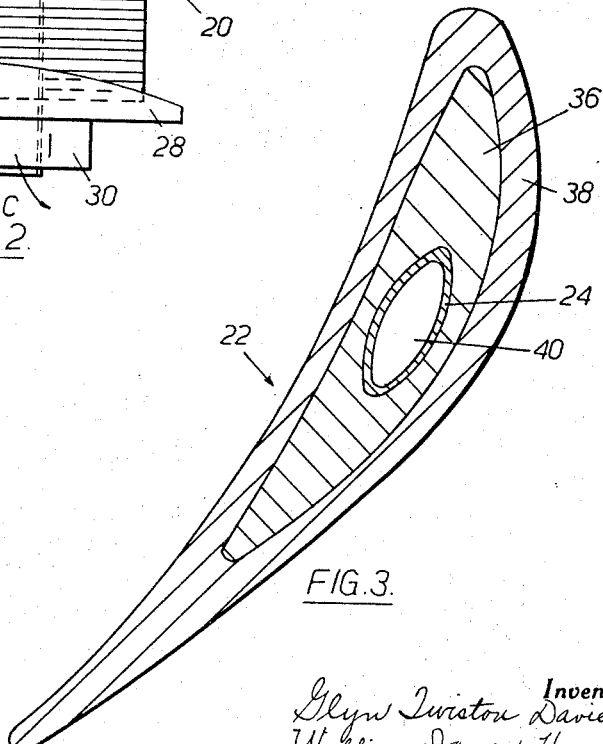
FIGURE 3 is a cross section of the guide vane, on an enlarged scale, taken on the line 3—3 of FIGURE 2.

The construction of the nozzle guide vanes 20 according to the present invention is illustrated in FIGURES 2 and 3. Each nozzle guide vane 20 comprises a plurality of laminar sections 22, each formed of ceramic material such as, for example, silicon nitride. The sections 22, which each have an aerofoil shape (FIGURE 3) are held together in compression by means of a tie bolt 24 extending through the nozzle guide vane 20, so that the laminar sections 22 form a nozzle guide vane 20 having continuous aerofoil surfaces.

At one end the tie bolt 24 is formed integrally with, or secured to, a radially outer platform member 26. The tie bolt 24 is secured at its other end to a radially inner platform member 28 by means of a nut 30 which maintains the bolt 24 in tension and thereby loads the ceramic laminar sections 22 compressively, the load being transmitted to the laminar sections via the platform members.

When the nozzle guide vanes 20 are assembled in the annular turbine nozzle 15, adjacent platform members 26, 28 abut each other to form continuous annular inner and outer platforms, defining the inner and outer boundaries respectively of the turbine nozzle 15.

The inner and outer platform members 26, 28 are each formed with aerofoil-shaped recesses 34, 32 corresponding in shape to the cross section of the nozzle guide vane 20 (FIGURE 3) so that, when the nozzle guide vane 20 is assembled and the laminar sections 22 loaded compressively by the tie bolt 24, the radially inner and outer ends of the nozzle guide vane 20 are received in the respective recesses 34, 32.

Each laminar section 22 comprises (FIGURE 2) separate inner and outer portions 36, 38 respectively, both said portions being formed of ceramic material and being in contact with each other. Each laminar section 22 may, if desired, be made up of more than two ceramic portions. The tie bolt 24 passes through the inner portion 36 and has a hollow interior 40 through which cooling air is directed in operation of the gas turbine engine 10, as indicated by the arrows C in FIGURE 2.

It will be apparent that, by virtue of the compressive loading of the laminar sections 22 by means of the tie bolt 24, failure of any one of the laminar sections 22 by tensile loading is a remote possibility. Moreover, should any one of the laminar sections 22 fail for any reason, any cracks which formed therein would be confined to that particular section 22 only and would be prevented from propagating through the nozzle guide vane 20.

Similarly, any cracking which occurred in one of the portions 36, 38 of a laminar section 22 would be confined to that particular portion and the other portion or portions would remain unaffected.

What is claimed is:

1. A blade for mounting in a fluid flow duct, said blade comprising a plurality of laminar sections each formed of ceramic material, platform members having recesses, the opposite ends of the blade being received in respective recesses formed in respective said platform members, and at least one tie member, said tie member being secured at opposite ends to the respective platform members whereby the tie member holds the laminar sections together in compression through the respective platform members.

2. A blade as claimed in claim 1 wherein each laminar section comprises at least one separate portion of ceramic material.

3. A blade as claimed in claim 2 wherein each laminar section comprises separate inner and outer portions of ceramic material, said portions being in contact with each other.

4. A blade as claimed in claim 1 having a passage for cooling fluid extending therethrough.

5. A blade according to claim 4 in which the at least one tie member has a hollow interior constituting said passage.

6. A gas turbine engine provided with stator blades as claimed in claim 1.

References Cited

UNITED STATES PATENTS

| | | | |
|---|---|---|---|
| 2,801,076 | 7/1957 | Terrell et al. | 253—78 |
| 3,163,397 | 12/1964 | Gassmann et al. | 253—77 |
| 3,271,004 | 9/1966 | Smuland | 253—39.15 |
| 3,301,526 | 1/1967 | Chamberlain | 253—39.1 |

EVERETTE A. POWELL, JR., *Primary Examiner.*